United States Patent
Zimmer et al.

[11] Patent Number: 5,907,995
[45] Date of Patent: Jun. 1, 1999

[54] THERMAL TREATMENT PROCESS AND DEVICE FOR FRICTION LINING SURFACES

[75] Inventors: Thomas Zimmer; Oliver Lauth, both of Essen; Norbert Jenniges, Mülheim; Ulrich Steinkämper, Essen, all of Germany

[73] Assignee: Rutgers Automotive Aktiengesellschaft, Germany

[21] Appl. No.: 08/849,437

[22] PCT Filed: Dec. 14, 1995

[86] PCT No.: PCT/EP95/04957

§ 371 Date: Nov. 24, 1997

§ 102(e) Date: Nov. 24, 1997

[87] PCT Pub. No.: WO96/19680

PCT Pub. Date: Jun. 27, 1996

[30] Foreign Application Priority Data

Dec. 22, 1994 [DE] Germany ............... 44 45 882

[51] Int. Cl.[6] ............. B30B 15/34; F16D 69/04
[52] U.S. Cl. ............. 100/38; 100/90; 100/207; 100/301; 100/319; 100/320; 100/323; 100/325; 523/149
[58] Field of Search ............... 100/38, 90, 207, 100/300, 301, 302, 305, 319, 320, 323, 324, 325; 523/149, 150, 152, 153, 155, 156, 157, 158, 159

[56] References Cited

U.S. PATENT DOCUMENTS

| | | | |
|---|---|---|---|
| 2,661,789 | 12/1953 | Keller | 100/320 |
| 2,662,960 | 12/1953 | Williams | 100/301 |
| 3,014,520 | 12/1961 | Myers | 100/207 |
| 3,505,446 | 4/1970 | Griffith | 523/158 |
| 4,187,777 | 2/1980 | Pringle | 100/301 |
| 4,543,147 | 9/1985 | Noto et al. | 100/207 |
| 5,080,969 | 1/1992 | Tokumura | 523/149 |
| 5,141,586 | 8/1992 | Myers et al. | 100/319 |

FOREIGN PATENT DOCUMENTS

| | | |
|---|---|---|
| 4032182 | 5/1991 | Germany. |
| 94/02754 | 2/1994 | WIPO. |

*Primary Examiner*—Stephen F. Gerrity
*Attorney, Agent, or Firm*—Blakely Sokoloff Taylor & Zafman

[57] ABSTRACT

A continuous, multiple-stage process for thermally treating the surface of friction linings by pressing them against heated units and cooled units. The total length of the transport and pressing phases of each stage taken together corresponds to the continuous production cycle of the linings. The scorching press for carrying out the process is made of modules, so that heated and cooled units may be easily exchanged for each other. A heat insulation reduces energy tosses and keeps constant the surface temperature of the heated units.

19 Claims, 2 Drawing Sheets

THERMAL TREATMENT PROCESS AND DEVICE FOR FRICTION LINING SURFACES

FIELD OF THE INVENTION

The invention relates to a method for thermally treating surfaces of friction linings by pressing against a heated plate in a scorch press and a scorch press for carrying out this method.

BACKGROUND OF THE INVENTION

Friction linings, particularly organically bonded friction linings, are nowadays frequently subjected to high thermal loading. Since they are supposed to produce a high braking force, even in the first braking process, the friction surface is thermally treated by pressing it against a hot plate (scorching) or with a gas flame or the like in order to prevent green fading (DE-A 4032182). The decomposition products of the organic bonding agent in the region close to the surface, which are responsible for the reduction in the coefficient to friction, are thus removed.

In the scorching process, e.g. 20 ground and post-hardened friction linings are pressed simultaneously against a hot plate at up to 750° C.

The heating process can be interrupted a number of times by ventilation in order to facilitate the removal of the decomposition products. The linings are subsequently cooled by pressing against a cooling plate. The back plates of the friction linings are then generally cleaned and coated.

It is disadvantageous in the known method that the friction surface is subjected to the maximum temperature even when it is pressed for the first time against the heating plate. Sealing of the surface can thereby occur which prevents the escape of the decomposition products. The temperature of the heating plate can also be maintained constant over its entire area only with great difficulty. Temperature variations of 15K and more are quite common. The friction linings of a scorched batch can thus have a different wear or coefficient of friction.

The treatment time for the scorching is naturally dependent on the shape and material of the friction lining, it is thus practically impossible to integrate the known scorching process into a continuous manufacturing method.

BRIEF SUMMARY AND OBJECTS OF THE INVENTION

It was thus the object to make a continuous thermal treatment of friction lining surfaces possible in which all the friction linings are treated with predetermined cycle times under the same conditions.

The object is solved if the friction bearings are supplied after hardening directly to the scorch press without significant cooling, if the friction linings are treated in the scorch press in a number of stages, each treatment stage lasting for a cycle period and including a transport phase and a pressing phase, the surface of the friction linings being pressed in the pressing phase against a respective thermally operative plate and the friction linings being pressed in a first pressing phase against a hot heating plate at up to 900° C. and, in a subsequent pressing phase, against a cooling plate.

The friction linings are preferably pressed with a pressing force of 50–5000 daN. Relatively high pressing forces effect no further improvement in the thermal transfer whilst an impaired thermal transfer must be tolerated at lower pressing forces. The transport phase corresponds to the ventilation phase in the known process.

Since the individual thermal treatment and cooling stages are performed in different modules of the scorch press, the temperature of each thermally operative plate and the pressing force in each stage can be set optimally in dependence on the shape of the linings and the composition of the friction composition. The friction surface can thus be heated or cooled in each stage to the temperature of the heating or cooling plate. The entire temperature variation with time at the friction surface may thus be controlled and sealing prevented. Furthermore, energy is saved by this temperature control. As a result of the splitting up into different heating modules, it is also simpler to maintain the surface temperature constant over the entire heating plate so that the deviations are at most 1K.

The cycle period is generally 3 to 60 s. 0.5 to 2 s are apportioned to the transport phase and 1 to 59.5 s to the pressing phase. When performed optimally, the desired temperature at the friction surface is reached in the pressing phase after 1 to 5 s.

The entire treatment time in the scorch press is determined, with constant cycle periods, by the number of the pressing phases against heating plates and the number of the pressing phases against cooling plates and this is variable and fixed for each lining. In general, five heat treatment stages and two cooling stages are sufficient for passenger vehicle disk brake linings.

The object is further solved by a scorch press with a plurality of modules, which each have a set consisting of a group comprising a heating unit and a cooling unit, a pressing device, which is movable towards the units and which has a pressure plate, a respective thermally operative surface being provided on the side of the units directed towards the pressing device, a suction device, a conveying device for positioning the friction linings between the thermally operative surface of the units and the pressure plate of the pressing device, a controller for the heating units and a controller for the conveying device and the pressing device.

A preferred embodiment is characterised in that a separate pressing device is associated with each module.

A separate suction device is advantageously associated with each module.

The heating and cooling units are preferably interchangeable. The scorch press can thus be converted without great technical expense for the treatment of friction linings of different shape or composition which necessitate a different number of cooling or heat treatment stages. The individual units can be demounted without difficulty for maintenance and repair work.

In order that the gaseous decomposition products can be rapidly removed from the thermally operative surfaces, particularly the heating surfaces, it is sensible to arrange the thermally operative surfaces of the units and thus also the pressure plates vertically and to exhaust the decomposition products away above the gap thus defined. The formation of a carbon layer on the heating surface, which impedes the thermal transfer, is thus prevented. The thermally operative surfaces, particularly the heating surfaces, must be so constructed that the linings do not cake onto them, when scorched. This can be achieved, for instance, by a coating of tungsten carbide.

The heating of the heating unit is effected by means of high power heating dies, the service life of which at the high thermal loading is dependent on unimpeded heat dissipation. In order to make possible on the one hand a firm seating of the dies in the heating block and on the other hand rapid replacement also, the heating block is split in the plane which passes through the axes of the heating dies, the two parts being pressed elastically against one another.

The pressing forces are conveniently transmitted to a steel frame by means of blocks of hard ceramic material. Arranged between the heating block and frame is inorganic thermal insulation in order to maintain the heat losses small and to exclude the environmental influences which impair the temperature control.

Since the different types of friction lining have different thicknesses but the movement time for the pressure plate should be as short as possible, it is appropriate to maintain the stroke of the plate small. This is achieved by readily replaceable pressure plates of different thickness so that a constant stroke can be maintained even with different friction lining thicknesses.

A preferred embodiment is characterised in that the pressure plate is coolable. This prevents the pressure plate being warmed up by a heating surface as a result of a small spacing.

The conveying device must convey the friction linings in the cycle during the transport phase from one module to the next. This can occur, for instance. with a conveyor chain which operates intermittently and on which appropriate carriers for receiving the friction linings are arranged. As a result of the high temperature and the small spacing between the heating surface and pressure plate, it is advantageous to move the conveying device out of the gap between the heating or cooling surface and the pressure plate during the pressing phase so that the friction linings are held only by the pressing force.

Such a device can comprise, for instance, a flat steel bar with recesses for receiving the friction linings which is movable horizontally and vertically within the gap.

BRIEF DESCRIPTION OF THE DRAWINGS

The invention will be explained below by way of example with reference to the drawings.

DETAILED DESCRIPTION OF THE INVENTION

Figure 1:
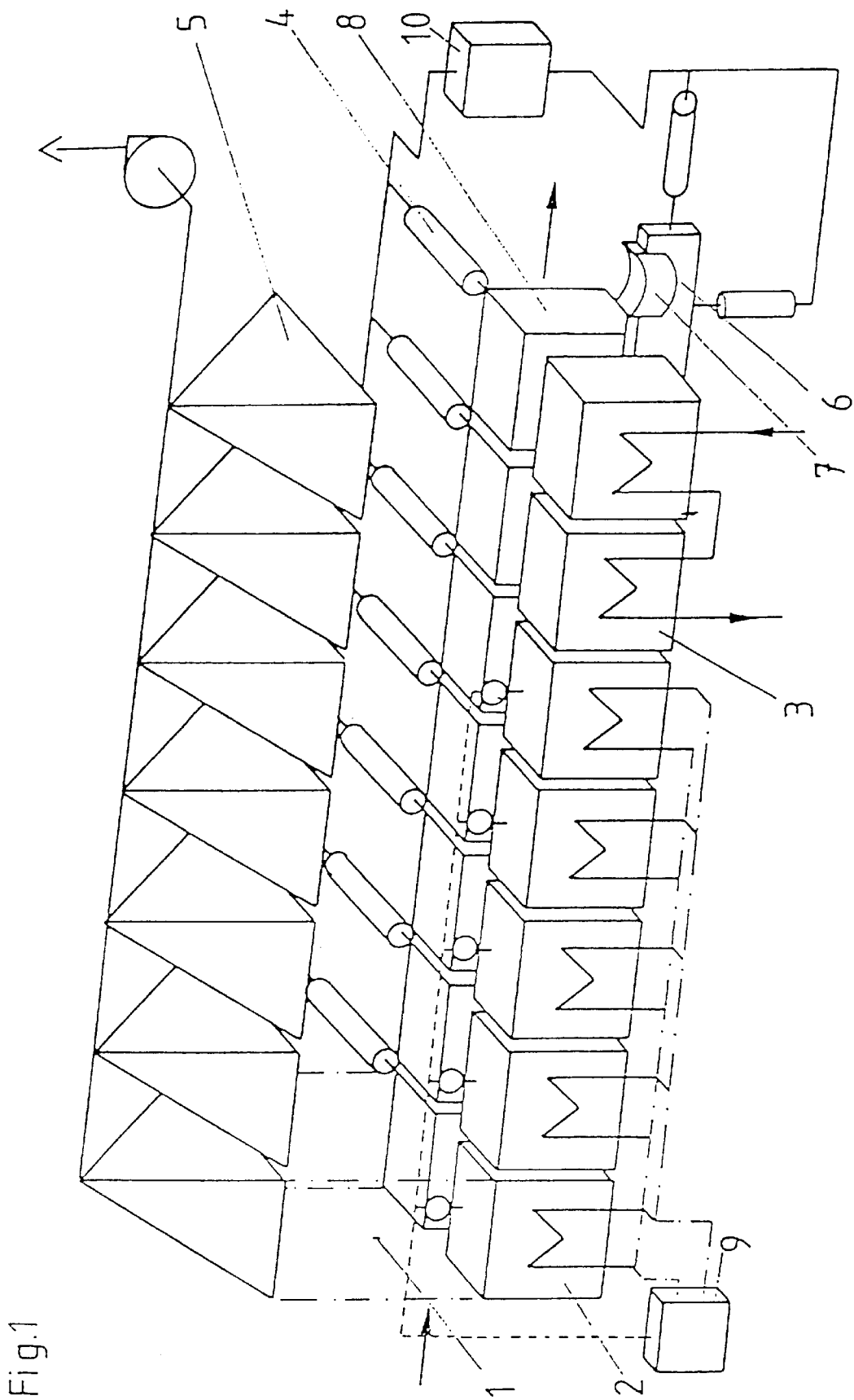
FIG. 1 shows the operating principle of the scorch press.

The friction linings 7 coming out of the hardening furnace are inserted individually into the recesses in the flat steel bar 6 at an interval of 10 s. The flat steel bar 6 is firstly lifted until the friction linings 7 clamped between the pressure plate 8 and the units 2 and 3 are situated in its recesses. The pressure plate 8 is then retracted by the pressing device 4 and the flat steel bar 6 is moved in the direction of the arrow until the friction linings 7 have reached their position in the respective following module 1. The friction surfaces of the friction linings are now pressed by the pressure plate 8 against the heating or cooling surfaces of the units 2 and 3, respectively with a force of 50–5000 daN and the flat steel bar is withdrawn downwardly out of the heating region.

The transport process from releasing the linings 7 until they are pressed again lasts about 2 s. The linings 7 are ventilated during this time so that the gaseous decomposition products can be removed from the heated module 1 by means of the suction device 5. The time sequence of the movement of the flat steel bar 6 and of the pressing device 4 is controlled by means of the controller 10. The drive is effected, for instance, by means of pneumatic cylinders. The flat steel bar 6 is moved in a direction opposite to that of the arrow back into its starting position during the heating or cooling process.

The scorch press comprises seven modules 1. The first five are equipped with heating units 2 and the remaining two with cooling units 3. The temperature control of the heating units 2 is effected by means of the controller 9. It is so designed that the final temperature in each stage is reached in about 5 s and thereafter is held for 3 s. It is ensured in this manner that the friction surface is heated to the respective temperature. The final temperature in the first stage is 350° C. in this case, 500° C. in the second stage, 600° C. in the third stage, 700° C. in the fourth stage and 750° C. in the fifth stage. The cooling is effected in the sixth stage to 350° C. and in the seventh stage to 100° C. The temperatures in the heating stages are adjustable in accordance with the lining. The amount of refrigerant can be controlled in the cooling stages by means of the desired temperature or the final temperature. Heating unit 2 and cooling unit 3 are interchangeable.

Figure 2:
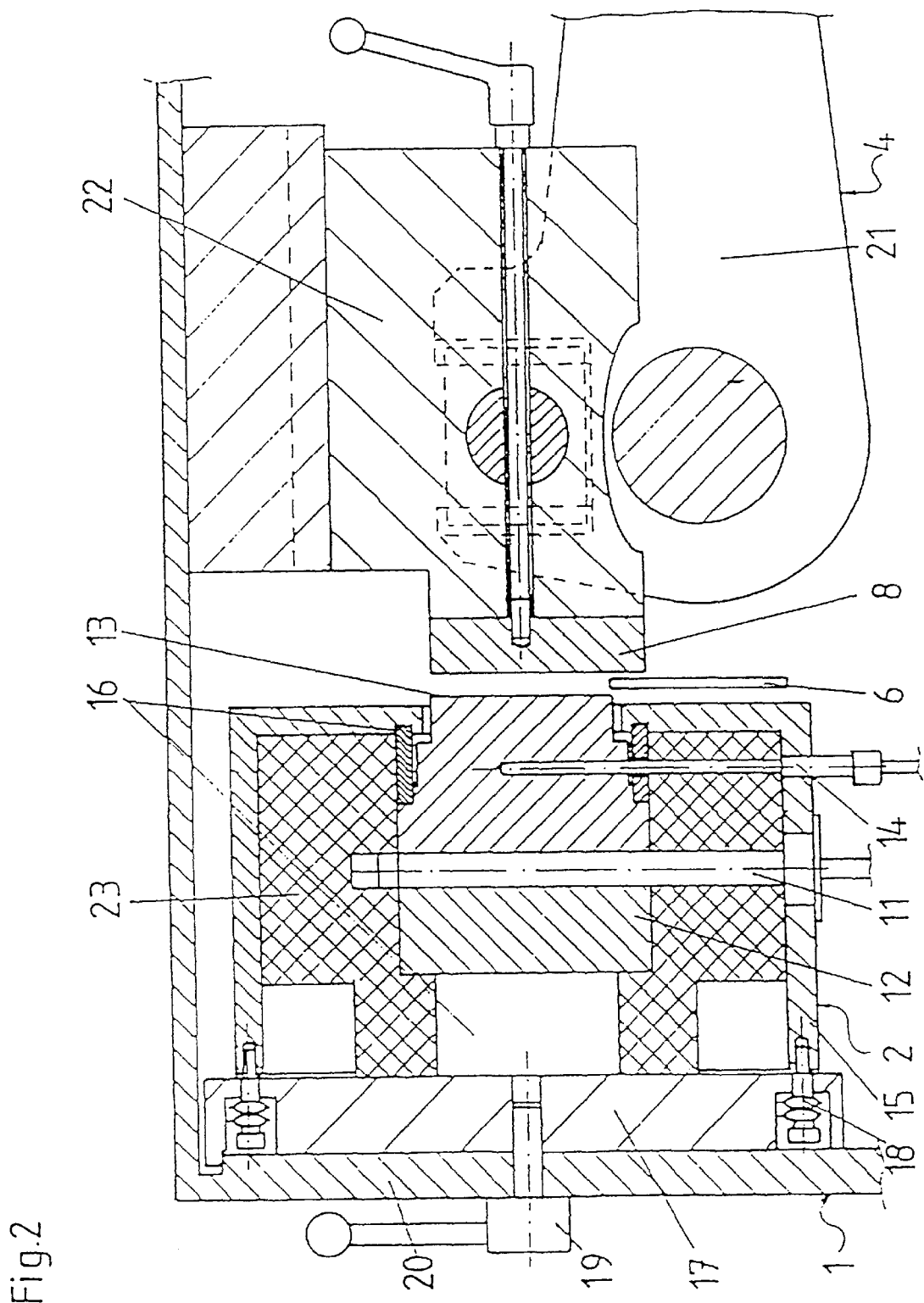
FIG. 2 is a sectional view through the heating unit and the adjoining region of the pressing device.

Since the construction of the heating unit 2 is of crucial importance for the constancy of temperature over the entire heating surface and the service life of the heating dies 11 and the speed of heating up, its construction is explained in more detail with reference to FIG. 2. The electrical heating dies 11 are surrounded by a steel block 12 which is split in the plane of the axes of the heating dies 11. The block 12 is surrounded by a ceramic insulating composition 23 with the exception of the heating surface 13.

It is also provided in the region of the heating surface 13 with a temperature sensor 14. The insulated block 12 is installed in a housing 15 from which the heating surface 13 projects. The block 12 bears via hard ceramic plates 16 against the inner wall of the housing and the rear plate 17 of the housing which is screwed to the housing 15 via springs 18. An adequate initial tension and the possibility of thermal expansion is achieved by the springs 18.

The entire heating unit 2 is readily releasably connected to the module frame 20 by means of a hand screw 19. In the pressing device 4, the toggle lever 21 is moved pneumatically and engages in a horizontally guided pressure block which is provided on its end face with the replaceable pressure plate 8.

We claim:

1. A method for thermally treating surfaces of friction linings comprising the steps of:

a) supplying the friction linings after hardening directly to a scorch press without permitting significant cooling;

b) subjecting the friction linings in the scorch press to a number of treatment stages, each treatment stage lasting a predetermined cycle period and including a pressing phase and a conveying phase, said scorch press treatment including:

i) at least one first treatment stage at a first position, said first treatment stage including a first pressing phase, wherein a surface of said friction linings is pressed against a hot heating plate, said hot heating plate heated to a temperature selected in a temperature range up to 900° C.;

ii) conveying said friction linings to a second position;

iii) subsequently treating said friction linings in at least one second treatment stage, by pressing said surface of the friction linings against a cooling plate.

2. The method as claimed in claim 1 wherein the friction linings are pressed with a pressing force of 50–5000 daN against said heating and cooling plates.

3. The method as claimed in claim 1 wherein the temperatures of the heating and cooling plate are independently adjusted, in order to control the temperature of said surface of said friction linings at said first and second positions.

4. The method as claimed in claim 1 wherein the cycle period is adjusted within a range from 3 to 60 sec.

5. The method of claim 1 further providing a plurality of hot heating plates; subjecting the friction linings in the scorch press successively to a plurality of first pressing phases with alternate conveying phases from the initial first pressing phase to any successive pressing phase and providing a stepwise increase of the temperature of said hot heating plates.

6. The method as claimed in claim 5 further including the steps of:
  a) providing a plurality of cooling plates, adjusting said cooling plates to different cooling temperatures;
  b) supplying the friction linings from the last one of said successive first pressing phases to an initial one of said second treatment stages; and
  c) cooling said surface of the friction linings to a first cooling temperature.

7. A method for thermally treating surfaces of friction linings using a scorch press having a plurality of modules each including a thermally operative surface and a pressure plate which is moveable towards an associated thermally operative surface, a conveying device for transferring and positioning friction linings between the thermally operative surface of said module and the associated pressure plate, a controller for controlling said thermally operative surfaces, and a controller for controlling the conveying device and the pressure plate motion, said method comprising the steps of:
  a) operating said temperature controller so as to heat at least one of said thermally operative surfaces to a temperature selected in a temperature range up to 900° C. so as to provide a hot heating plate;
  b) operating said temperature controller so as to cool said thermally operative surface of another module to a cooling temperature which is substantially lower than said heating temperature;
  c) supplying the friction linings after hardening to a first position between a thermally operative surface and the associated pressure plate of a first module, said thermally operative surface heated to a first heating temperature;
  d) exerting pressure to said pressure plate and moving the same towards the heated surface so as to press the surface of the friction lining against said heating plate;
  e) withdrawing said pressure plate from said friction linings and said hot heating plate;
  f) conveying said friction linings from the first position in a first module to a second position in a second module, said second module having a thermally operative plate heated to a second heating temperature elevated with respect to said first heating temperature;
  g) operating said second module in the way defined in said steps d) and e);
  h) conveying said friction linings into at least one additional position in at least one additional module that has a thermally operative surface adapted to cool said friction linings down to a selected first cooling temperature;
  i) operating said additional module in the way defined in said steps d) and e);
  j) further conveying said friction linings into at least one further position and in at least one further consecutive module and operating said at least one further consecutive module as defined in said steps d) and e), whereby said friction linings are first heated in stepwise manner to an upper treatment temperature and thereafter cooled in a stepwise manner to a final cooling temperature.

8. The method of claim 7 wherein said conveying and treatment steps in each treatment stage has a unitary cycle period.

9. The method of claim 8 wherein said friction linings are subjected to five consecutive stepwise heating treatments and two consecutive stepwise cooling stages.

10. Scorch press for use in a method for thermally treating surfaces of friction linings, said scorch press comprising:
  a) a plurality of modules (1), each said module including a heating unit (2), a cooling unit (3), a pressing device (4) which is movable towards the heating and cooling units and which has a pressure plate (8),
  b) a respective thermally operative surface (13) being provided on the side of the heating and cooling units (2, 3) directed towards the pressing device (4),
  c) a suction device (5),
  d) a conveying device (6) for positioning the friction linings between the thermally operative surface of the units (2, 3) and the pressure plate (8) of the pressing device (4),
  e) a controller (9) for the heating units (2), and
  g) a controller (10) for the conveying device (6) and the pressing device (4).

11. Scorch press as claimed in claim 10 wherein a separate pressing device (4) is associated with each module.

12. Scorch press as claimed in claim 10 wherein a separate suction device (5) is associated with each module (1).

13. Scorch press as claimed in claim 10 wherein the heating and cooling units (2, 3) are interchangeable.

14. Scorch press as claimed in claim 10 wherein the thermally operative surfaces (13) of the heating and cooling units (2, 3) are vertically arranged.

15. Scorch press as claimed in claim 10 wherein the heating unit (2) is surrounded by a housing (15) and includes heating dies (11), which are installed in a block (12) having the thermally operative surface (13), the block (12) being divided in the plane of the axes of the heating dies (11) and being surrounded, with the exception of the thermally operative surface (13), by a ceramic insulating composition (23) and bearing via hard ceramic plates (16) on the housing (15).

16. Scorch press as claimed in claim 10 wherein the thermally operative surface (13) is coated with tungsten carbide.

17. Scorch press as claimed in claim 10 wherein the pressure plate (8) is replaceable.

18. Scorch press as claimed in claim 10 wherein the pressure plate (8) is coolable.

19. Scorch press as claimed in claim 10 wherein the cooling unit (3) is provided with a controller for controlling the amount of refrigerant provided to the cooling unit.

* * * * *

UNITED STATES PATENT AND TRADEMARK OFFICE
CERTIFICATE OF CORRECTION

PATENT NO. : 5,907,995
DATED : June 1, 1999
INVENTOR(S) : Zimmer et al.

Page 1 of 1

It is certified that error appears in the above-identified patent and that said Letters Patent is hereby corrected as shown below:

Column 3,
Line 22, delete "This can occur, for instance." and insert
-- This can occur, for instance, --.

Column 4,
Line 5, delete "five are equipped with heating units 2" and insert -- five are equipped with heating units 6 --.

Signed and Sealed this

Thirty-first Day of July, 2001

*Attest:*

NICHOLAS P. GODICI
*Attesting Officer*   *Acting Director of the United States Patent and Trademark Office*